United States Patent [19]
Gaines

[11] 3,716,091
[45] Feb. 13, 1973

[54] MAGNETIC CLOSURE
[76] Inventor: Alvin M. Gaines, 219 B Shadow Park, Gwinnette County, Near Norcross, Ga. 30071
[22] Filed: Sept. 14, 1970
[21] Appl. No.: 71,696

[52] U.S. Cl. .................150/40, 70/456 R, 206/37 K, 206/DIG. 33, 220/55 MG, 292/251.5
[51] Int. Cl. .........................A45c 11/32, E05c 17/56
[58] Field of Search........206/37 K, DIG. 33; 150/40; 220/55 MG; 292/251.5; 70/456 B, 456 R

[56] References Cited
UNITED STATES PATENTS

| 3,468,576 | 9/1969 | Beyer et al. | 292/251.5 |
| 2,041,259 | 5/1936 | Morrison | 220/DIG. 26 UX |
| 2,408,150 | 9/1946 | Moeller | 206/42 |
| 1,403,087 | 1/1922 | Largman | 150/40 |
| 1,424,121 | 7/1922 | Staples | 150/40 |
| 1,621,831 | 3/1927 | Colvin | 70/456 B |
| 2,091,545 | 8/1937 | Hovey et al. | 70/456 B |

FOREIGN PATENTS OR APPLICATIONS

| 355,912 | 9/1961 | Switzerland | 220/55 MG |
| 1,201,673 | 7/1959 | France | 292/251.5 |

Primary Examiner—Leonard Summer
Attorney—Patrick F. Henry

[57] ABSTRACT

A magnetic closure for keycases, pocketbooks, wallets, and other containers which provides a positive opening as well as a closing by means of magnets with respective North and South poles so positioned as to bring opposite poles into proximity for positive closing and like poles into proximity for opening. One panel of the keycase or other container is provided with the sliding magnet and another panel of the keycase has the fixed magnet whereby manually sliding one with respect to the other causes the magnets to assume the position of similar or dissimilar polarity.

The keys are held by fixed loops and a flexible wire.

3 Claims, 6 Drawing Figures

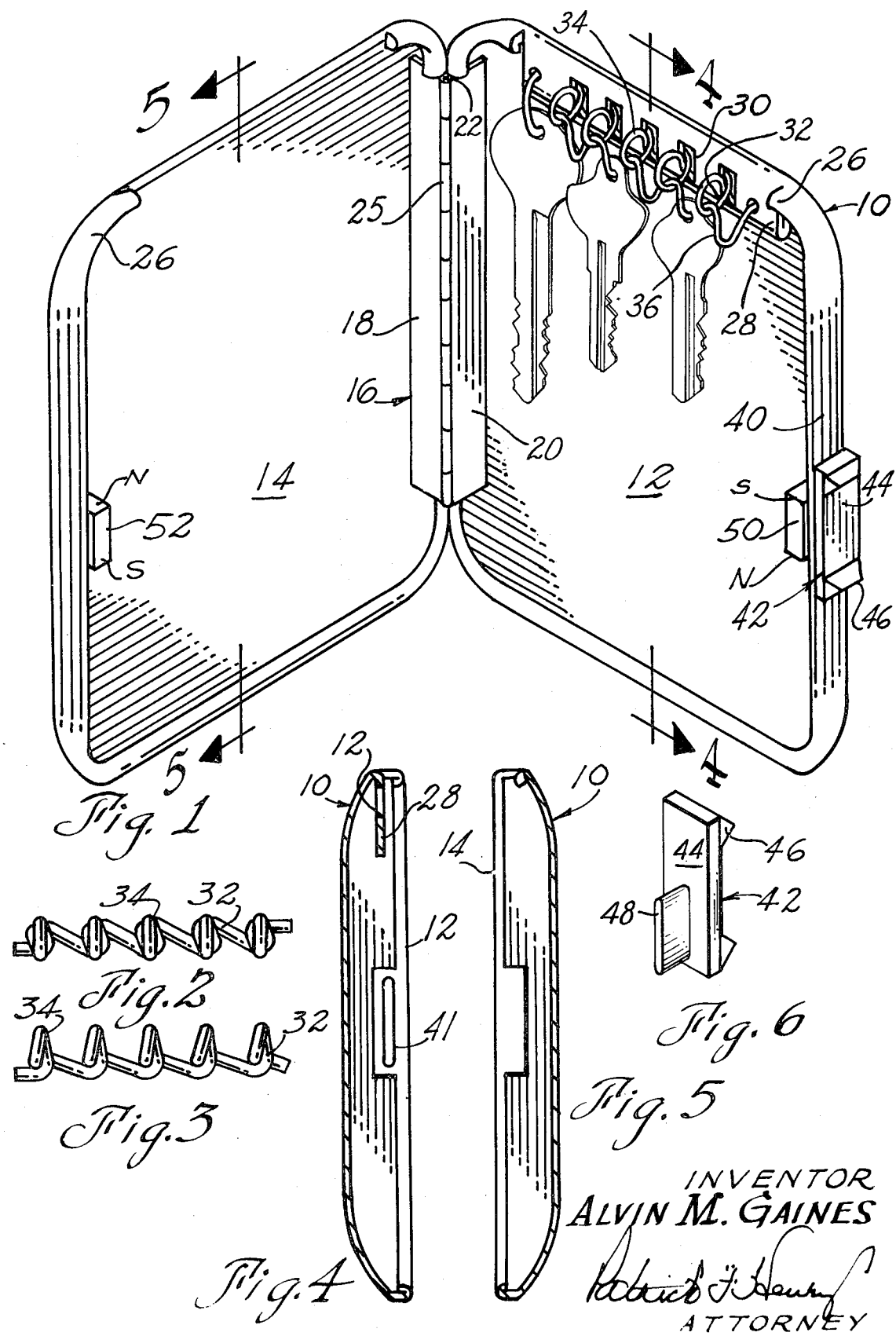

MAGNETIC CLOSURE

BACKGROUND OF THE INVENTION

1. Field of the Invention

Closures for pocketbooks, keycases, wallets and the like. Magnetic closures for keycases.

2. Description of the Prior Art

Broadly the use of magnetic material or magnets for closures is old. Specifically magnets have been used as closures for pocketbooks as shown by U.S. Pat. No. 2,327,532 but such magnets are fixed and provide only limited magnetic attraction for holding the pocketbook closed and such magnetic force must be small enough to be overcome easily by hand. Such arrangements do not provide any motion of one magnet to assist in closing or opening and merely provide an arrangement of opposite magnet poles to hold the device closed and manual force necessary to pull them apart.

SUMMARY OF THE INVENTION

One panel in a keycase or wallet or the like has another panel attached thereto and the panels are relatively movable. A fixed magnet is fixed to one panel and a movable magnet is mounted on the other panel so that the movable magnet may be relocated to change the position of the North and South poles — it being well known that like magnetic poles repulse and unlike magnetic poles attract. Unlike prior art closures which have a fixed amount of magnetism between magnets which must be overcome by manual force to pull the keycase or pocketbook apart, the present arrangement movable magnet is moved manually a small amount which causes the opposite poles to separate and like poles to come into proximity thereby opening the latch or closure. A stronger magnetic attraction may be provided in closed position since shifting of the magnet will overcome this attraction without a lot of manual force from the fingers. Keys may be mounted on a flexible cord in fixed rigid loops.

BRIEF DESCRIPTION OF THE DRAWINGS

FIG. 1 is a perspective view of a typical keycase with the present magnetic closure thereon and in open position.

FIG. 2 is a front elevation view of the loop arrangement in FIG. 1.

FIG 3 is a top plan view of the loop arrangement in FIG. 1.

FIG. 4 is a cross-sectional view taken along lines 4—4 in FIG. 1 with parts removed.

FIG. 5 is a cross-sectional view taken along lines 5—5 in FIG. 1 with parts removed.

FIG. 6 is a perspective view of a detail of the latch.

DESCRIPTION OF THE PREFERRED EMBODIMENT

A typical keycase is designated by reference number 10 in FIG. 1 and comprises two panels 12, and 14 which for sake of description may be considered as the stationary panel 12 which holds the keys in the hand and movable panel 14 which moves out of the way to expose the keys for use. Panels 12 and 14 are mounted together by means of a hinge 16 of conventional construction comprising fixed plate 18 attached by glue or otherwise to panel 14, a fixed plate 20 attached by glue or otherwise to panel 12, and a pivot pin 22 through matching, alternate hinge loops 24.

Panels 12 and 14, which may be molded from plastic, or made of covered metal, or any conventional case and container construction, have turned edges 26 and the top of the edge 26 on panel 12 bent upon itself, at 28 and provided with openings 30. The bent, looped wire 32 shown in FIGS. 2 and 3 is inserted through openings 30 by extending each loop 34 through a respective hole 30 and then the material of edge 28 is turned against the wire 32 to hold it in place. A flexible cable of nylon, plastic, wire and the like 36 is looped through each loop 34 and has its ends fixed in the material of the bent edge 28. Keys are placed on the flexible loops of wire 36.

Front edge 40 of panel 12 has a slot of 41 in which is mounted a magnet latch member 42 shown in FIG. 6 comprising a block 44 with finger protrusions 46 and a support member 48 which extends inside the case 10 and on which is glued or otherwise mounted a magnet 50 having a North pole and a South pole as shown. Panel 14 has a magnet 52 with North pole and South pole and it is glued or otherwise secured in place on panel 14 opposite the magnet 50 in panel 12 when the panels are closed against each other. However, latch member 42 moves slightly in its slot to bring the South pole of its magnet 50 against the North pole of magnet 52 in one position (the closed, latched position) and movement of the latch member 42 in the other direction brings the South poles of each magnet 50, 52 in close proximity initially thereby causing repulsion and opening of the panels 12, 14.

While this has been illustrated with a keycase, it may be applied to other cases such as wallets, suitcases, instrument cases and in fact any case or device which has a closure. Therefore, while I have shown and described a particular case (keycase) and a special arrangement, this is by way of illustration only and does not constitute any sort of limitation on my invention as various changes, alterations, omissions, additions, deviations, and departures may be made in the embodiment shown without avoiding the claims hereinafter.

What is claimed:

1. In a magnetic closure and the like, such as a keycase, wherein there is one panel which is movable relative to another panel:
   a. a first panel having a movable latch member thereon and a magnet movably mounted on said panel to be moved by said latch member,
   b. a second panel having a fixed magnet thereon opposite said movable magnet, said magnets being relatively movable with respect to each other,
   c. both of said magnets having North and South poles thereon and in closed condition said panels being latched by the magnetic attractions of said opposite poles being close enough to attract and said latch member being movable by hand to bring said like poles close enough to cause repulsion thereby opening said closure,
   said keycase having a loop member thereon with a plurality of loops therein; and a flexible key retainer member running through said loops providing other loops between said loops in said loop member, and keys strung on at least some of said loops.

2. The device in claim 1: said fixed loops being formed from a continuous member.

3. The device in claim 2: said fixed loop continuous member being mounted on said case inside one of the edges thereof bent upon itself.

* * * * *